United States Patent
van Riet

[11] 4,017,157
[45] Apr. 12, 1977

[54] APPARATUS FOR THE DIGITAL DISPLAY OR RECORDING OF DATA

[75] Inventor: Aloysius Johannes van Riet, Rijswijk, Netherlands

[73] Assignee: Maatschappij Van Berkel's Patent N.V., Rotterdam, Netherlands

[22] Filed: Mar. 26, 1975

[21] Appl. No.: 562,238

[30] Foreign Application Priority Data

Mar. 26, 1974 Germany ........................... 2414368
Dec. 23, 1974 Germany ........................... 2461253
Dec. 23, 1974 Germany ........................... 2461239

[52] U.S. Cl. ........................ 350/160 LC; 177/2; 177/DIG. 6; 350/96 BC
[51] Int. Cl.² ..................................... G02F 1/13
[58] Field of Search ............. 177/2, 3, 4, 5, DIG. 6; 235/58 PS, 61 PS; 350/96 BC, 160 LC

[56] References Cited
UNITED STATES PATENTS

| | | | |
|---|---|---|---|
| 3,196,964 | 7/1965 | Allen | 177/3 |
| 3,360,672 | 12/1967 | Marshall | 350/96 BC |
| 3,397,022 | 8/1968 | Cole | 350/96 BC |
| 3,582,297 | 6/1971 | Lakeman | 350/96 BC |
| 3,622,226 | 11/1971 | Matthies | 350/160 LC |
| 3,626,423 | 12/1971 | Ameen | 346/107 R |
| 3,661,444 | 5/1972 | Matthies | 350/160 LC |
| 3,824,604 | 7/1974 | Stein | 350/160 LC X |
| 3,838,565 | 10/1974 | Carlyle | 350/160 LC X |
| 3,838,909 | 10/1974 | Fitzgibbons | 350/160 LC |
| 3,891,309 | 6/1975 | Bonne | 350/160 R |

*Primary Examiner*—Edward S. Bauer
*Attorney, Agent, or Firm*—Lockwood, Dewey, Zickert & Alex

[57] ABSTRACT

The apparatus includes a liquid crystal cell having transparent front and back walls with transparent electrodes on their facing sides and a liquid crystal material between the walls. The electrodes are segmented into matrix elements according to the cumulative pattern of all characters desired to be displayed or recorded, and are electrically addressable in response to selection circuitry. The front wall is in the form of a fiber-optic plate comprising a plurality of parallel arranged optical fibers. The apparatus is particularly useful to display or record measurement data, such as from a weighing device.

18 Claims, 20 Drawing Figures

APPARATUS FOR THE DIGITAL DISPLAY OR RECORDING OF DATA

This invention relates in general to an apparatus for digitally displaying or recording data, and more particularly to a liquid crystal cell having a fiber-optic plate, and still more particularly to an apparatus for digitally displaying and/or recording measurement data taken form a measurement device such as a weighing scale.

The present invention is primarily concerned with a measuring device, such as weighing scale where weight and price information can be displayed or recorded on a label, although it should be appreciated the liquid crystal cell with a fiber-optic plate could be used wherever there would be a need to digitally display or record data symbols. While it may be understood the invention is particularly concerned with the display and/or recording of alpha-numerical data, the work "data" is intended to also include any desire code markings or identification symbols.

Heretofore, saleable merchandise was commonly marked by means of mechanical printers defining a set of characters. A correct set of characters would be first brought into alignment with the print area by an adjusting movement and an impression would then be made in the print area. A disadvantage is the time needed to adjust the printer which increases approximately in proportion to the number of characters in the printer. Considerable adjustment times were needed for alpha-numerical marking of merchandise due to the large number of characters so the printing speeds were low. Higher printing speeds were made possible by a parallel printer employing a flying impression, where a drum rotating at high speed carries a complete set of characters for each print area, and from which a printing hammer selects the desired character. Since the rotating drum moves during the printing process, a velocity vector in the plane of the record carrier caused poorly formed imprinted characters. This is unacceptable if code marks recorded at high speed are to be faultlessly legible, especially because the individual code symbols have to be very small considering the restricted size of the label.

Where the invention is desired to be used in connection with a weighing scale for recording data on a record carrier such as a label, alpha-numerical data and/or machine readable code marks of individual values for weight and unit price are developed and applied to the record carrier in response to a weighing operation. A plurality of liquid crystal cells develop the data pursuant to an input unit with adjustable fixed text. The output of the cells is transmitted to the record carrier. By transmitting the output of the cells to one or more display windows, the data can be read, whereby the invention functions as a digital display apparatus. Displayed data for a weighing scale would normally include weight and price information. Recorded data might additionally include price per unit weight, the name of the article, the packing date, durability, and machine-readable code marks. The record carrier is photosensitive, whereby it will display the data exposed to it by the liquid crystal cells. The present invention specifically enables fine or sharply defined machine-readable code marks and/or alpha numerical data to be photographically transferred onto a record carrier at high operating speeds.

Each liquid crystal cell includes front and back spaced transparent walls arranged together and sealed at the edges to define a chamber which is filled with a suitable liquid crystal material, such as a nematic compound or substance. Transparent electrodes or electrode profiles in the form of segments capable of defining the characters or markings desired are mounted on the facing sides of the walls and connected to an input unit which delivers programmed electrical signals to the electrodes. At the output side of the cell, a fiber-optic plate sharpens the image produced by the cell and essentially functions as a "contrast intensifier." This plate may be additional to the front wall or define the front wall. A suitable source of light energy is provided, whereby selective application of electrical energy to the electrodes changes the optical properties of the liquid crystal material between the energized electrodes, causing an image to be produced at the output side of the cell where the data appears dark on a display window or on a record carrier against a light background. The liquid crystal cell is small in size, being only a few millimeters high and highly reliable. The electrochemical generation of the characters in the cell and their electrical readout makes it possible to dispense with movable parts for selecting the character. The electrical output produced by a device for recording measured values, such as a modern check-weigher, can easily be used for the direct control of the liquid crystal cell. For the sake of simplicity, the word "light" is used, but it is understood to include electromagnetic energy of any wave range.

The fiber-optic plate includes a plurality of parallel arranged optical fibers embedded in a light-absorbing material. The thickness of the effective nematic substance in a liquid crystal cell is only a few microns. In connection with a display, it is true that the contrast could be improved by increasing the thickness of the substance, but such results in a considerable increase of the time required for the changeover in the electrically addressed cell regions necessary to alter the optical properties of the nematic substance. This time period increases approximately in proportion to the square of the thickness of the substance. In order to avoid an increase of the change-over duration in such cases, it is also known to divide the whole substance of the cell into several thinner cell chambers lying one behind the other, each of which is provided with electrodes and all of which are addressable simultaneously as in U.S. Pat. No. 3,661,444. This is costly to make because of the multiplication of the number of components needed to construct and control the cell. Moreover, the multiple partition walls result in the need for a larger space for the cell and in an undesirable loss of transmitted light due to reflections and refractions in the numerous layers which decreases the improvement in contrast. Since the human eye has a logarithmic sensitivity and therefore register changes in contrast as significant only when the differences in brightness change by powers of ten, no sufficient improvement in contrast can be expected from this proposal. Such an increase in contrast through an increase in cell thickness by a factor of, say, ten or a hundred cannot be realized in practice, and a mere doubling or trebling of the cell thickness has no effect.

In one embodiment the optical fibers and the light rays extend perpendicular to the plane of the fiber-optic plate and the cell.

In another embodiment, the fibers extend perpendicular to the plane of the plate and cell, and the light rays are inclined to the plate at an angle greater than the critical angle at which total reflection of light occurs in the fibers at the boundary surface between the fibers and the light-absorbing fiber embedding material.

In still another embodiment, the light rays are perpendicular to the plate, and the fibers are inclined to the plate at an angle greater than the critical angle for total reflection. Because of the inclination of the light rays relative to the axes of the fibers, the rays which have passed undisturbed through the liquid crystal material in the region of unaddressed electrodes are not only reflected each time they strike the wall of the individual fibers, but since they obey the law of optical refraction, they pass with a considerable portion of their light intensity into the embedding medium of the fiber-optic plate and are there attenuated by the light-absorbing medium. Since each fiber has a diameter of, for example, a few microns, such as about 6 to 20, and is at least several hundred times as long, several hundred reflections of a light ray can occur along the fiber. Such a light ray is therefore attenuated within a short length in the fiber and practically no luminous energy leaves the fiber-optic plate at this fiber. On the other hand, in those regions of the cell where electrically addressed electrodes provide for a dispersion of light in the cell, considerable proportions of the light scattered in this place arrive in the fibers at a substantially steeper angle of incidence, so that total reflections occur at the boundary surface between fibers and the embedding medium, i.e., at the inside of the fiber wall. Here, all the entering light leaves the fiber concentrated at its other end without losing any of its energy to the embedding medium and can produce on the photosensitive surface of the record carrier or in a display window a sharp luminous point of sufficient intensity.

Thus, this embodiment of the invention is unique in that, by reversing the light distribution of an addressed character in the cell behind the fiber-optic plate inclined relative to the light beam, a negative image of this character is produced with a substantially higher contrast. Accordingly, a bright character is obtained on a practically black background instead of a character of lesser brightness on a bright background. While the liquid crystal material permits light to pass substantially without atenuation, this light is totally attenuated in the zone of the fiber-optic plate, and no light impinges on the photosensitive surface of the record carrier. In the area of the electrically addressed electrodes of the cell, that proportion of the light scattered in the liquid crystal material which enters the fibers of the optic plate is transmitted through the fiber-optic plate in its totality so that at these places an exposure occurs of the photographic record carrier. The contrast between the areas where light is transmitted and those where no light is transmitted through the fiber-optic plate is very clear and sharp.

Transmitted light is provided where the invention is concerned with recorded data, while transmitted or incident light may be provided in the digital display apparatus of the invention. Frosting the outer face of the fiber-optic plate where the invention is concerned with display of data permits a wide angle reading.

Heretofore, liquid crystal cells for applying data on a record carrier have been known, such as in U.S. Pat. No. 3,622,226, and a plurality of liquid crystal cells arranged in superposed relation has been known, such as in U.S. Pat. No. 3,661,444.

However, the present invention achieves an image production sharper than heretofore possible by utilizing a fiber-optic plate, and further by causing the angle between the light rays and the optical fibers in the plate to exceed the critical angle which causes total reflection of the light rays at the boundary layer and embedding material for the fibers, the contrast of the imaged area is further increased.

A complete character set may be latently stored at a character transfer station in the apparatus by an appropriately fine profiling of the transparent electrodes. The required character can be generated within a few thousandths of a second by electrically addressing the appropriate portions of the electrode profiles. As already mentioned, a character is generated because optical changes occur in the liquid crystal material in the space between electrically addressed electrode portions, which alter the path of rays in this region. Depending upon the profile of the addressed electrodes, the selected character suddenly appears in this place, optically contrasting with the background of the remaining character set with the electrode portions not addressed electrically, which remains latent.

The present invention does not require any bulky or overly large components since the fiber-optic plate does not substantially increase the dimension of the device in depth and the device can even have the same dimensions when, in one embodiment of the invention, the fiber-optic plate simultaneously forms the end wall of the liquid crystal cell facing the observer. In this case, the fiber-optic plate is in the place where otherwise a glass plate would be positioned to close the cell. Further, the fiber-optic plate lying on the display side acts as a barrier against unwanted light coming in, e.g., reflected.

It is therefore an object of the present invention to provide an improved apparatus for digitally displaying or recording data, and more particularly to an apparatus utilizing a liquid crystal cell having a fiber-optic plate that materially increases the contrast of the image produced at no extra expense, thereby improving reading accuracy.

Another object of the invention is in the provision of a liquid crystal cell having a fiber-optic plate at the output side where the angle between the light rays for the cell and the optical fibers in the plate exceeds the critical angle at which total reflection occurs in the fibers, thereby preventing such light from exiting from the fibers.

Other object, features and advantages of the invention will be apparent from the following detailed disclosure, taken in conjunction with the accompanying sheets of drawings, wherein like reference numerals refer to like parts, in which:

Figures 1, 3:
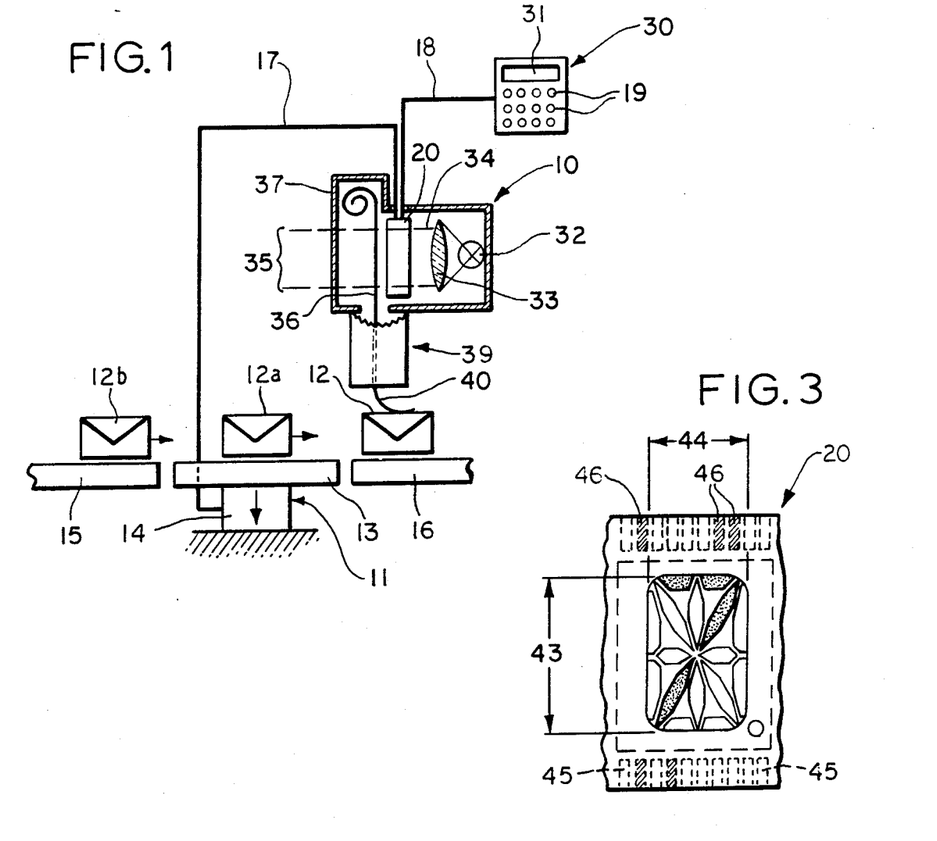
FIG. 1 is a schematic view of one form of an apparatus for recording data in accordance with the invention.
FIG. 3 is a greatly enlarged fragmentary top plan view of a part of the cell illustrating one form of an alpha-numerical presentation.

Referring now to the drawings, and particularly to the embodiment of FIG. 1, one form of a system according to the invention is illustrated, which includes a unit pricing apparatus 10, a weighing scale or device 11 disposed in the path of a line of moving articles illustrated here as packages 12, 12a and 12b. A weighing platform 13, loaded in the direction of arrow 14 to ascertain the weight of package 12a, is positioned for this purpose between the ends of two conveyor belts 15, 16. The weight 14, in the form of an electrical pulse or signal produced by an electronic circuit not shown in detail, is transmitted through a control line 17 to a liquid crystal cell 20 in the apparatus 10. An input unit 30 having and controlled by a keyboard 19 is connected to the cell 20 through a control line 18. As will be explained in detail, the input unit introduces into the apparatus a fixed text by appropriately controlling the cell 20 by electrical means. The preset fixed text may be read off a scale 31 in the input unit 30 either directly or indirectly by symbols.

A light source 32 and, if necessary, an optical means 33 defines a light beam 34 with parallel rays for the cell 20. The light leaving the cell 20 arrives at a section 35 of a record carrier 36 which consists of a series of continuously arranged labels. This series of labels 36 can be stored in the apparatus in the form of a roll 37.

When the liquid crystal cell is addressed via the control lines 17, 18, a label is precisely aligned in section 35 with the light beam 34 by a driving device not shown in detail. The label 36 has on its side facing the cell 20 a photosensitive layer 38 shown in detail in FIG. 2, which when illuminated by the light beam 34 photographically records the symbols addressed in the cell 20. For this purpose, the light beam 34 may be directed to the cell for a short time by a shutter diaphragm to obtain the required exposure of layer 38 on label 36 to a sufficient degree. It would also be possible to use as the light source 32 a flashlight to obtain recording on the label 36 in section 35.

After exposure in section 35, the labels 36 are driven to a developing and fixing device 39 where the originally latent image is made visible on the label in a known manner. The construction of this device 39 depends on the photosensitive layer 38 chosen for the label 36. Instead of using photographic developing methods and the appropriate devices at station 39, the markings on the label can also be produced by an electrostatic method such as employed in modern copying machines. Practically and copying method can be used at this station to transfer the recordings of cell 20 to the label 36. The finished marked label 40 arrives from the device 39 of the apparatus 10 at the package 12 moving along it. This is a label which was aligned with section 35 of the apparatus 10 at the time when the package 12 was on the weighing device 11 and when its weight was marked on this label by the apparatus 10. Accordingly, every package 12 is provided with the correct label 40 corresponding to it. The device for attaching the label 40 is not shown in detail since this may be of a customary construction. The label 40 can for this purpose be provided with a self-adhesive coating at the back. On the finished label 40 there first appear the fixed texts inserted by the preset keys on keyboard 19 of the input unit 30, such as the designation of the packed article, its price per unit weight, packing date and durability. The label is also marked with the individual data ascertained by the weighing device 11, which includes the weight 14 and the unit price calculated by a suitable device based upon the weight and the preset price per unit weight. If desired, other individual data derived from a measuring device can be programmed in the cell 20. Further, it can be appreciated the packaging material could serve as the record carrier.

Figure 2:
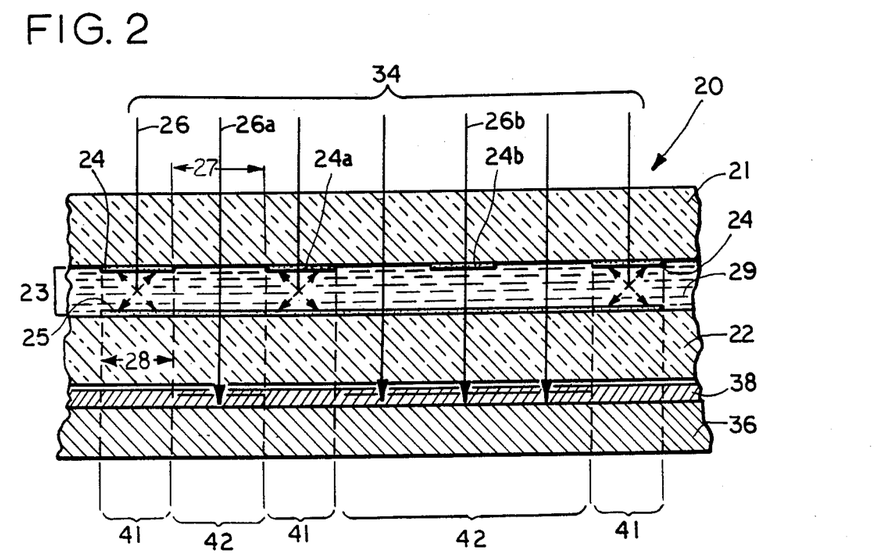
FIG. 2 is a greatly enlarge fragmentary and somewhat diagrammatic cross-sectional view taken through a liquid crystal cell utilized in the apparatus of FIG. 1.

The construction of cell 20 is shown in FIG. 2, which is not drawn to scale. The cell 20 consists of front and rear light transparent end walls 21, 22, made of any suitable material such as glass. The thickness of these walls is two millimeters at the most, and they are sealed at the edges and spaced apart a very small distance 23, such as a few microns. The space enclosed between the walls 21, 22 is filled with a known nematic substance, which in the desired range of operation of the apparatus 10 is in the required liquid crystallinic state. Accordingly, the liquid crystal material is only a few microns in thickness. The inner surfaces of the cell walls 21, 22 facing each other are provided with electrodes 24, 25 that are transparent to the light in the beam 34. These electrodes are applied to the walls by evaporation of metallic oxides in a known manner. The electrode 25 is continuous while the other electrodes 24 are divided into different areas 24, 24a, 24b and the corresponding terminal leads according to the required characters. However, the electrodes 25 may be segmented as illustrated in FIG. 1 and which will be described hereafter. The layout is such that a complete set of characters, an example of one which is illustrated in detail in FIG. 3, is latently prepared in alignment with the desired spot in the above-mentioned section 35 of the subsequent record carrier.

For purposes of explaining the operation of the cell, reference will be made to three possible different types of light rays 26, 26a, 26b of beam 34. It is assumed here a voltage applied to the areas 24, 24a of the top electrode with respect to the continuous electrode 25 is sufficient to produce a parallel orientation of the molecules of the liquid crystal material 29 in space 23 between the contour edges of the profiled electrode areas 24, 24a. The molecules of substance 29 in the intermediate regions 27 and the area adjacent electrode 24b where no voltage is applied remain disoriented so that no change occurs there. However, in the regions of space 28 between the electrode 25 and the electrodes 24, 24a to which voltage is applied, changes occur in the dielectric constant, electric conductivity, index of refraction, etc., due to the orientation of the molecules, and the liquid crystal material here becomes anisotropic. The light rays 26 entering the areas of addressed electrodes are strongly scattered, as indicated by the arrows in FIG. 2, wherein these regions of space thus become distinctly darker as compared to the other regions 27, where no upper electrodes are provided, and where the electrodes are not addressed, the light ray 26a can therefore penetrate without hindrance and impinge the record carrier 36. If the cell is viewed in the see-through direction, dark characters in accordance with the profile of the corresponding electrode areas 24, 24a appear in the regions of space 28 to which voltage is applied. This distinctly darker area appears on a bright background which results from the light rays 26a, 26b which penetrate without attenuation, thereby defining a clear image. Since parallel light is used in the beams 34, sharp-contoured images of the profiles of these electrode areas 24, 24a are obtained on the photosensitive layer 38 of the label 36. The regions 28 lying in the path of these electrode areas 24, 24a thus cause the light in these places to be darkened. The accurate silhouette inside the boundary edges of these electrode areas 24, 24a is formed on the photosensitive layer 38 as shown by dash lines. Following development, dark characters 41 corresponding to these profiles are obtained in an otherwise bright field 42.

FIG. 3 illustrates a character set for the cell. While the representation of figures merely requires an electrode pattern of seven segments, a sixteen- or fourteen-fold segment structure is needed for an alpha-numerical representation, i.e., letters and figures in one location. The outline of the total space for the character set is determined by the height 43 and width 44 indicated in FIG. 3, which define the size of the bottom counter-electrode 25. The pattern of a seventeen-fold electrode is illustrated here, and which is produced by appropriately etching the evaporation coated layer of the top wall 21. The terminals situated outside the field of vision as well as the terminal connection (not shown in detail) between these terminals and the corresponding electrode areas are produced in the same way. For example, application of voltage between the terminals 46, hatched in FIG. 3 for the sake of clarity, and the terminals 45 of the counter-electrode, the molecules of the liquid crystal material under the darkened electrode areas of FIG. 3 are imparted a parallel orientation. The light rays then produce, on the label 36, the digit "seven" and a decimal "point." Every other digit and every letter can be produced at this location by suitably addressing the individual divided electrode areas through the corresponding terminals 46.

It should also be appreciated a dot or line pattern, either to form directly legible characters or to produce a symbolic script of machine-readable code marks may be utilized in place of or in addition to the character set illustrated. By addressing appropriate electrodes, a corresponding imprint may be made on the label 36 due to the transfer of these symbols from the cell by optical projection, and very fine code marks can be produced exactly on a label within a few milliseconds at a much greater speed than heretofore achievable with a printer. Where the invention may provide the exact transfer of machine-readable code marks, the labeling of articles according to FIG. 1 can permit docoding by a reader at the check-out counter of a store and automatic totaling and conversion to digital data, making it unnecessary to manually enter the prices into the cash register. This precise handling excludes all possibilities of error in reading the code by the machine.

Figures 4, 5, 6:
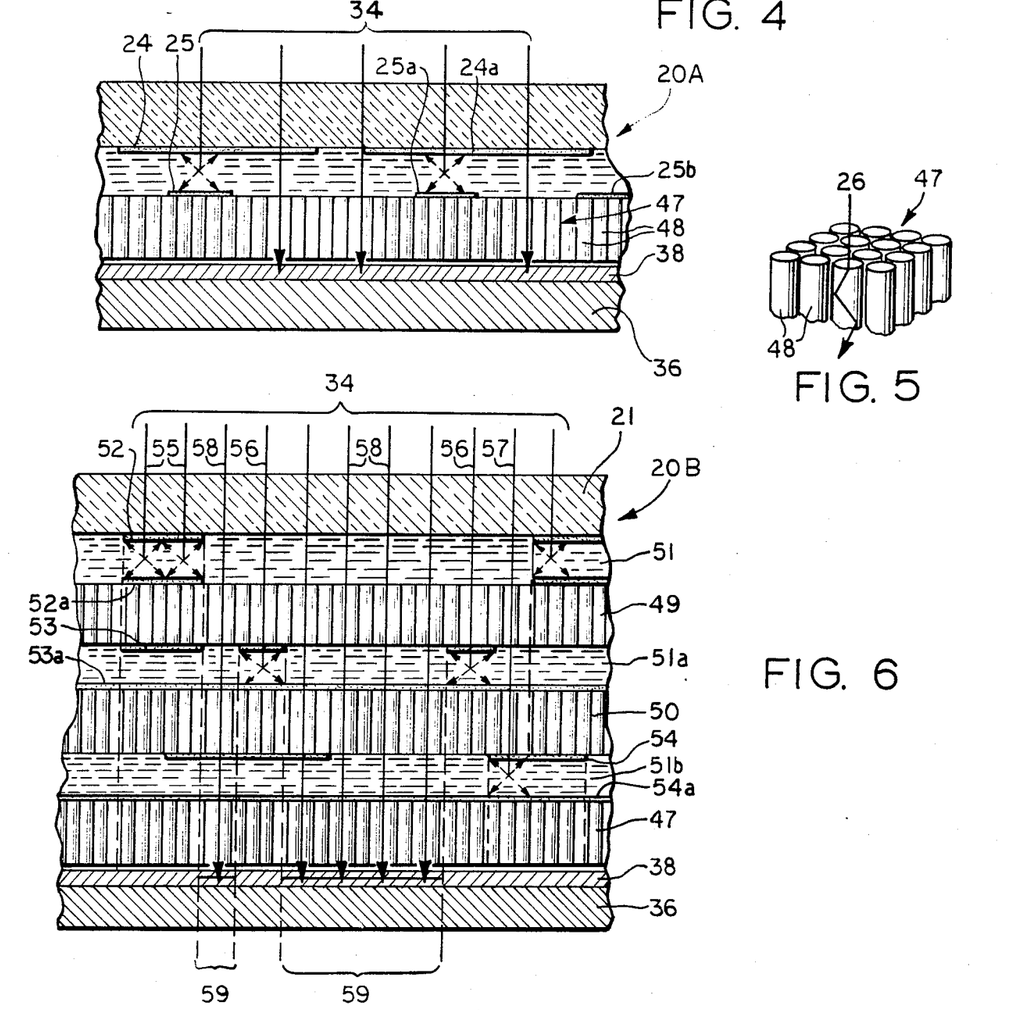
FIG. 4 is a greatly enlarged and somewhat diagrammatic cross-sectional view taken through another form of liquid crystal cell wherein a fiber-optic plate is utilized.
FIG. 5 is a greatly enlarge perspective view of a group of optical fibers taken from the fiber-optic plate shown in FIG. 4.
FIG. 6 is a greatly enlarged fragmentary and somewhat diagrammatic cross-sectional view taken through another form of liquid crystal cell according to the invention.

FIG. 4 represents a modified embodiment of the invention, wherein the cell is generally designated as 20A. The reference numbers used to indicate the identical parts are therefore identical to those used for the first embodiment. This embodiment differs in that not only the top electrode 24, 24a but also the bottom electrode 25, 25a and 25b is segmented, thereby making it possible to achieve a still finer resolution. It should be recognized the electrodes may be made in the form of lines, where the lines of the one electrode 24 run transversely with respect to the lines of the other electrode 25. However, the more important difference is in the cell wall on the light exit or output side which consists of a fiber-optic plate 47. The photosensitive layer 38 of the label 36 is positioned adjacent this fiber-optic plate.

The fiber-optic plate 47 is illustrated in greater detail in FIG. 5 and includes a plurality of closely packed parallel optical fibers 48 about 6 to 20 microns in thickness. The fibers are perpendicular to the plate surface and they function to obtain an exactly parallel orientation of the light passing therethrough. As clearly shown for fiber 48 in FIG. 5, only nearly vertical light rays, such as light ray 26, can pass through the fiber plate, while inclined or obliquely directed light rays are reflected by the inner walls of fiber 48. Since the fiber plate with a maximum thickness of two millimeters is still thicker by several degrees of magnitude than the diameter of a fiber, a practically vertical passage of light is required. This results in a highly sharp-contoured imaging of the electrodes on the photosensitive face 38 of the label 36, even when the light in beam 34 is not parallel. Any suitable light source which will penetrate the cell 40 is sufficient.

Another form of liquid crystal cell, generally designated by the numeral 20B, is shown in FIG. 6. This cell differs from the embodiment of FIG. 4 in that the cell 20B effectively includes a plurality of liquid crystal cells mounted in superposed relation. Walls in the form of fiber-optic plates 49, 50 are disposed in the cell in addition to the front end wall 21 of glass and the rear end wall consisting of the fiber-optic plate 47. Between all these walls there are separate chambers 51, 51a, 51b containing liquid crystalline substances. Since the spacing between the walls is only a few microns, the total thickness of the cell is essentially determined by the number of the cell walls, each of which is on the order of magnitude of two millimeters at most. Despite these multiple chambers, the total depth of the cell 20B is less than ten millimeters. Each of these chambers has on its opposite inner faces a pair of cooperating electrodes 52, 52a; 53, 53a; 54, 54a, of which electrode pairs at least one of the electrodes is appropriately profiled to form individually or together with its counter-electrode a portion of the character to be represented. The manifold arrangement of the electrodes one behind the other makes it possible to have a considerable store of different characters available in one surface region. More specifically, the trebling of the recording space in the embodiment of FIG. 6, as compared to that illustrated in FIG. 4, permits a trebling of the character set per cell. It is not necessary to illuminate the cell 20B with parallel beamed light because of the several fiber-optic plates. A sharp-contoured image on the photosensitive layer of label 36 is also obtained from the electrodes 52, 52a addressed in the topmost chamber 51. The light rays 55 are scattered in the first chamber 51 by the selected addressing. The electrodes 53, 53a of the second chamber 51a, which are struck by light rays 56, cause a dark image to appear at their profile, and finally the electrodes 54, 54a addressed in the last chamber 51b produce a corresponding effect on the light rays 57. The light rays 58 arrive practically unattenuated on the photosensitive layer of label 36 since they penetrate the electrodes which have not been addressed in the various chambers, and they form the bright background 59 on the label in contrast to the intermediate dark layer. An increased darkening of the imaged character is obtained by addressing several electrode regions lying one behind the other or overlapping one another. By using different voltages and various substances in the individual chambers, it is also possible to produce colored images and tones of different intensity in the print, e.g., when color-photographic layers may be used for the label. The use of fiber-optic plates always provides a high definition of image independent of the parallelism of the light beam 34 employed.

Figure 7:
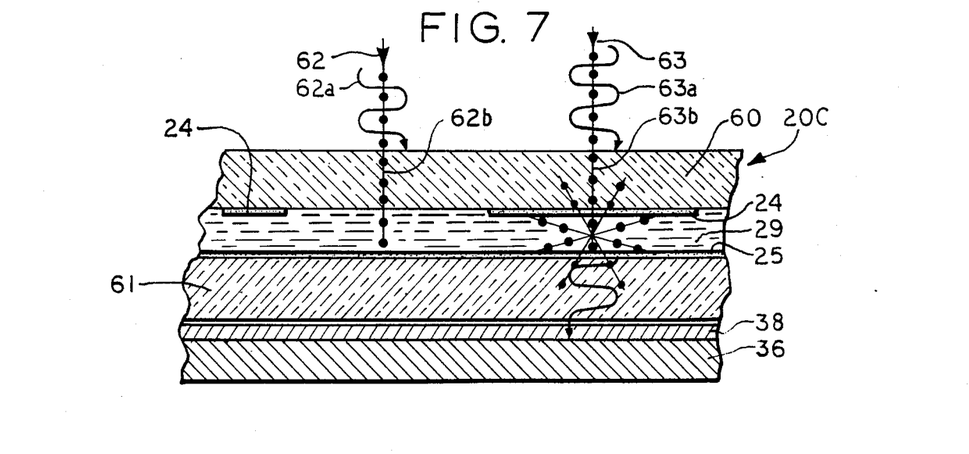
FIG. 7 is a greatly enlarged fragmentary and somewhat diagrammatic cross-sectional view of a still further type of liquid crystal cell.

A liquid crystal cell 20C is illustrated in the embodiment of FIG. 7, which differs from the cell illustrated in the first embodiment primarily in that the top end wall 60 of the cell and also the bottom end wall 61 consist of material which polarizes the light. The top wall 60 serves as a polarizer, while the bottom wall 61 as an analyzer, wherein the polarizing effects of these two walls oppose one another. In the simplest case, materials are used for these plates which transmit plane-polarized light. The upper wall 60 transmits vertically polarized light only, as symbolically represented by a light ray 62 having components 62, 62a at right angles one to the other. The polarizer 60 absorbs the component 62a vibrating horizontally and only transmits the component of light 62b which is absorbed in the analyzer 61. No light 62 is transmitted through the cell in those areas where no voltage is applied to the corresponding electrode regions 24, 25, and a dark field appears on the record carrier 36 corresponding to those areas. However, if a control voltage is applied to the two electrodes, as shown at 24a, 25 for a light ray 63, the transmitted light is affected in liquid crystal material 29 because of the molecule orientation. The horizontally vibrating component 63a of the light is here also suppressed or absorbed in the polarizer 60, but the plane of polarization of the vertical component 63b is rotated in the substance behind the addressed electrode 24a so that, though the vertical component is totally absorbed in the analyzer 61 as before, the horizontal component formed can pass through and can produce the desired darkening on the photosensitive layer of the record carrier 36. By this action a bright area can be produced on a dark field. This construction of cell 20C is advantageous because of the high contrast in the image obtained.

Figure 8:
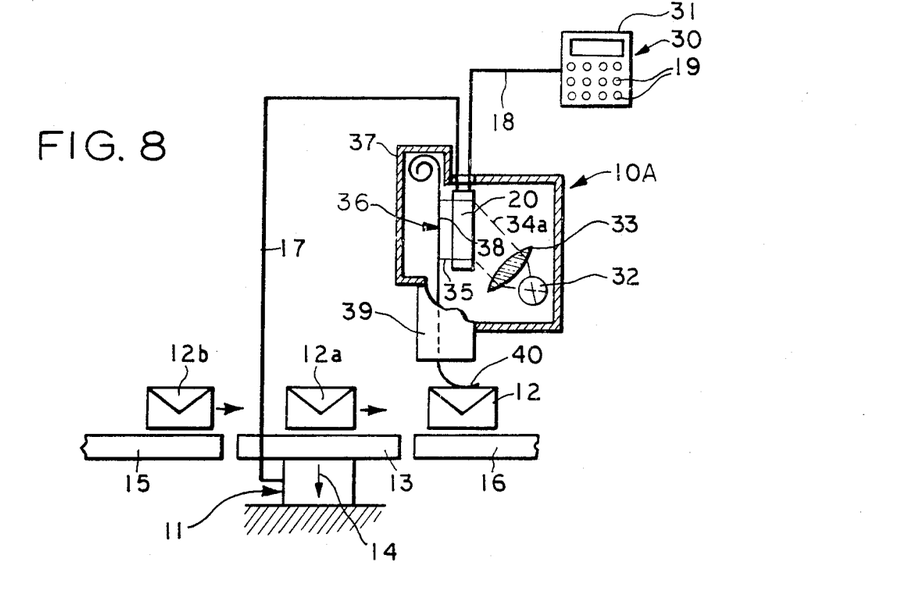
FIG. 8 is a schematic view of a modified data recording apparatus according to the invention.

Referring now to the system illustrated in FIG. 8 and generally indicated by the numeral 10A, a modification of the system shown in FIG. 1 is illustrated, wherein the light column, now identified as 34A, is inclined relative to the axis of the liquid crystal cell 20 in a manner to be more clearly hereinafter described. Except for obliquely illuminating the liquid crystal cell 20, the system 10A is otherwise the same as the system 10 in FIG. 1, and therefore identical parts will be identified with the identical reference numerals. It may be further appreciated with respect to this system and any other system according to the invention, as already mentioned, the light or electromagnetic radiation may be of any suitable wave length and relative to the sensitivity of the photosensitive layer on the record carrier 36.

Figure 9:
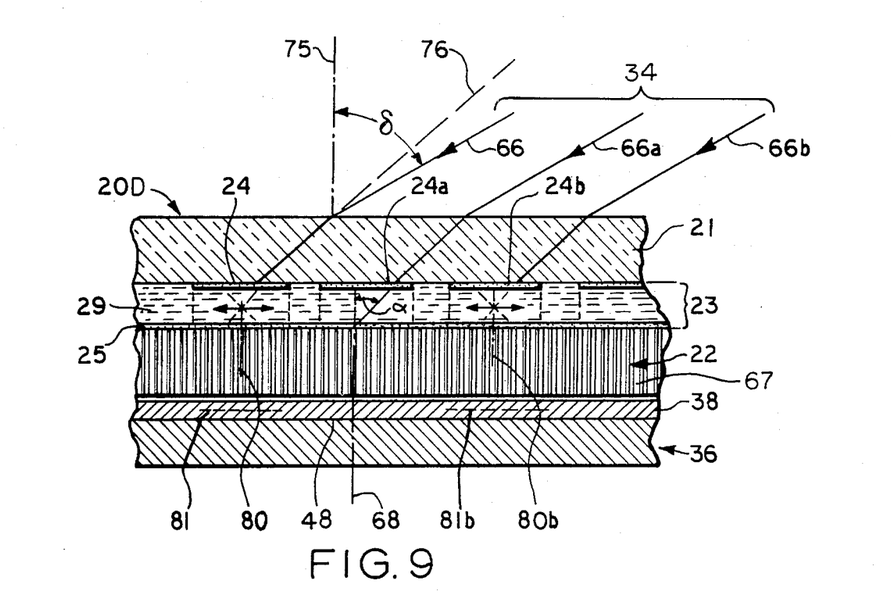
FIG. 9 is a greatly enlarged fragmentary and somewhat diagrammatic cross-sectional view taken through a liquid crystal cell utilized in the apparatus of FIG. 8.

The construction of one form of liquid crystal cell is illustrated in FIG. 9 and is substantially identical to the cell 20A of FIG. 4 except for the pattern of electrodes or electrode profiles, wherein the output of this cell, which is generally designated by the numeral 20D, is the reverse from the output of the cell 20A, as will be more clearly hereinafter understood. Reference numerals used for the embodiment of FIG. 9 identifying the like parts for the embodiment of FIG. 4 are the same.

For purposes of explaining the operation of the cell 20D in FIG. 9, three light rays 66, 66a and 66b from the light beam or column 34 are directed toward the end wall 21 and therein refracted to the liquid crystal material 29. It is assumed here that a sufficient voltage is applied between the common electrode 25 and the electrodes 24 and 24b to cause parallel orientation of the molecules of the liquid crystal material between these electrodes and the electrode 25. It will be appreciated that the molecules of the material outside the areas of influence of the electrodes 24 and 24b, including the area of influence of electrode 24a, will remain disoriented and thereby have substantially no effect on the light rays passing therethrough. As in the previous embodiments, the light rays directed toward the areas of addressed electrodes 24 and 24b become widely scattered, as indicated by the arrows, prior to impingement upon the lower wall 22 which is the form of a fiber-optic plate. The response of the fiber-optic plate 47 to the directly impinging light rays and to the scattered light rays can best be explained by reference to FIG. 10, which schematically illustrates the action of the light rays in the fiber-optic plate.

Figure 10:
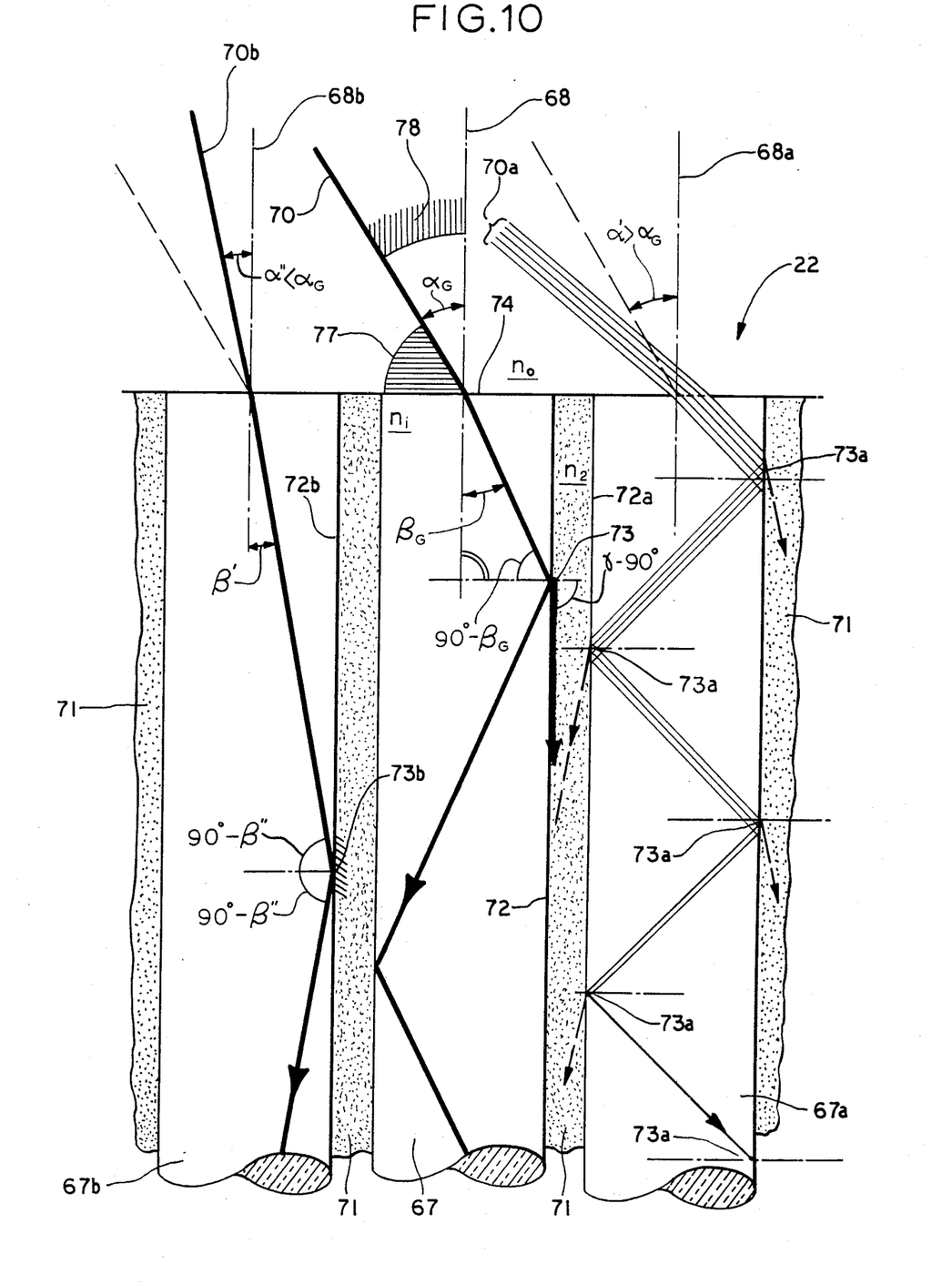
FIG. 10 is a still further greatly enlarged cross-sectional view taken through the liquid cell of FIG. 9, and particularly a portion of the fiber-optic plate and to illustrate the operation of the plate relative to light rays coming into the plate at three different angles of inclination.

Referring to FIG. 10, three optical fibers 67, 67a and 67b, having axes 68, 68a and 68b respectively, are illustrated as receiving light rays 70, 70a and 70b respectively at angles of incidence $\alpha_G$, $\alpha'$, $\alpha''$. A light-absorbing embedding material or medium 71 having an index of refraction $n_2$ which is less than the index of refraction $n_1$ for the optical fibers 67, 67a, 67b surrounds each of the optical fibers. The light entry side of the fiber-optic plate 47 includes a medium having an index of refraction $n_0$ which is the liquid crystal material 29. The index of refraction $n_0$ for the liquid crystal material is equal to or slightly less than the index of refraction $n_1$ of the optical fibers.

Since the optical fibers are optically denser than the embedding medium 71, a certain limit angle $\alpha_G$ is defined between the light ray 70 striking the fiber-optic plate 22 and the fiber axes 68, wherein total reflection will still occur inside the fiber at the wall 72, whereby the light ray 70 here runs in the substance 71 along the wall under an angle of refraction $\gamma = 90°$, as seen in FIG. 10 with fiber 67. At any angle less than limit angle $\alpha_G$, light rays in the hatched range of angles 78, e.g., the ray 70b, there are no refractions at such areas of incidence 73 and 73b, and the light is fully transmitted by the fibers 67 and 67b respectively. According to the physical law of total reflection, the sine of the angle of incidence at the point of reflection 73, here the angle $(90° - \beta_G)$ at the boundary layer defined by the wall 72 of fiber 67, is for the boundary case of total reflection equal to the ratio of the two indices of refraction, $n_2:n_1$. This angle of incidence $(90° - \beta_G)$ at the point of reflection 73 in FIG. 10 is defined because at the front face of fiber 67, due to the refraction between the media $n_0$ and $n_1$, the light ray 70 changes its above-mentioned angle of incidence $\alpha_G$ in the preceding medium with the index of refraction $n_0$ into an angle of refraction $\beta_G$ relative to the fiber axis 68 in the following medium with the index of refraction $n_1$. According to the known trigonometric relation, $\sin(90° - \beta_G)$ equals $\cos \beta_G$, the following equation results in the present case for the above-mentioned limit angle $\alpha_G$ for total reflection:

$$\cos \beta_G = \frac{n_2}{n_1}$$

According to another trigonometric relation where the sum of the sine squared of an angle and the cosine squared of the same angle equals one, the foregoing formula results in the relation:

$$\sin \beta_G = \sqrt{1 - \frac{n_2^2}{n_1^2}} \quad (1)$$

The light ray 70 is refracted at the front face 74 of this fiber 67 as illustrated, and therefore the following relation is obtained for the limit angles $\alpha_G, \beta_G$ and the indices of refraction $n_0$ and $n_1$ according to the optical law of refraction:

$$\sin \alpha_G = \frac{n_1}{n_0} \cdot \sin \beta_G \quad (2)$$

If the value of $\sin \beta_G$, found according to formula (1), is substituted in formula (2), the following value is obtained for the limit angle for total reflection $\alpha_G$, for which the light ray incident at the point of reflection 73 glances along the surface 72 of fiber 67:

$$\sin \alpha_G = \frac{\sqrt{n_1^2 - n_2^2}}{n_0} \quad (3)$$

Total reflection of the light ray, as has been assumed from the angle $\alpha''$ for the left-hand fiber 27b in FIG. 10, is obtained for all angles of incidence $\alpha$ smaller than the limit angle $\alpha_G$ resulting from formula (3). The incidence of the light ray 70b at the indicated point of impact 73b in the wall 72b of this fiber 67b is so flat that no refraction of the light takes place with any part of the luminous energy passing into the embedding medium with the index of refraction $n_2$. On the contrary, the entire energy of the light ray 70b is reflected at an angle of emergence $(90° - \beta'')$, whereby no light is lost at the point of impact 73b, which acts as a perfect mirror.

If the angle of incidence $\alpha'$ of a light ray 70a is larger than limit angle $\alpha_G$, as illustrated by means of the right-hand fiber 67a in FIG. 10, a considerable portion of the luminous energy passes, in accordance with the laws of refraction, into the embedding medium at the corresponding points of impact 73a of the light ray 70a at the boundary surface between this fiber 67a and the embedding medium 71. This is illustrated for light ray 70a by indicating the instantaneous intensity of the ray with the aid of a number of parallel lines. At the first point of impact 73a, the refracted line shown continuing in the embedding medium 71 indicates that part of the luminous energy is lost here, since this component is absorbed in this medium 71 rather quickly. Thereafter, the partially attenuated ray 70a proceeds to the next point of impact 73a at the opposite side of the wall 72a, where a further portion of the luminous energy is lost in a corresponding manner. This occurs in a corresponding manner at each further point of impact 73a inside this fiber 67a. Accordingly, no energy is left of the incident light 70a to emerge at the exit side of the fiber 67a, whereby the ray 70a has been completely attenuated by refraction and reflection in its passage through this fiber 67a. As already noted, the diameter of the fibers in the plate 22 may be only a few microns, such as 6 to 20, while the length of the fibers is in the order of magnitude of millimeters, such as two millimeters. Therefore, at least several hundred points of impact result for a light ray 70a entering under an angle of incidence $\alpha'$ larger than $\alpha_G$.

The present invention makes use of these characteristics. In the cell of FIG. 9, this is achieved by letting the incident light strike the fiber-optic plate 22, as illustrated by light ray 66a, at an angle of incidence $\alpha$ with respect to the axis 68 of the individual fibers 67 larger than the limit angle $\alpha_G$ for total reflection, resulting from the formula (3) given above. This angle of incidence relative to the fiber axis 68 is obtained here by letting the incident light beam 34 strike the cell 20D at an angle $\delta$ relative to the perpendicular shown as 75. This slant angle $\delta$ results from the desired angle $\alpha$ by considering the refractions of light which occur in the preceding media 29, 21. Corresponding to the above-mentioned limit angle $\alpha_G$ there also exists a corresponding limit angle for the slant of the incident light beam 34, indicated in FIG. 9 by the dashed line 76. As can be seen, the slant angle δ is selected to be larger than that indicated by the dashed line 76.

The light ray 66a of light beam 34 behaves in the region of the electrodes 24a, 25, which are not electrically addressed, in the same manner as the light ray 70a illustrated in FIG. 10. No light arrives at the photosensitive layer 38 of the record carrier 36 in the region of the electrode 24a and of the adjacent areas. Rays entering under an angle lying in the range of the hatched field 77 are blocked by the fiber or attenuated in the same way as the light ray 70a.

The light rays 66, 66b of the incident light beam 34 in FIG. 9 are, however, scattered in the liquid crystal material 29 by the action of the electrically addressed electrodes 24, 24b. Therefore, parts of the light assume a slant relative to the axis 68 of the fibers 48 which differs from the original angle of incidence α and is smaller than the limit angle $α_G$ given by formula (3). The conditions for these rays 66, 66b are then the same as those explained in detail for light ray 70b in FIG. 10, where total reflection occurs at the wall 72b of the corresponding fibers, as indicated by the hatching at the point of impact 73b which acts as a mirror surface to reflect the light without loss. Such light is illustrated in FIG. 9 as being transmitted through the optical fibers in the fiber-optic plate 22 by arrows 80, 80b which light therefore reaches the photosensitive layer 38 of the record carrier 36 in accordance with the profile of the electrodes 24, 24b, thereby documenting the desired character. The irradiated portions 81, 81b of the photosensitive layer 38 are illustrated in FIG. 9 corresponding to the profile of the electrodes 24, 24b.

Figures 11, 13:
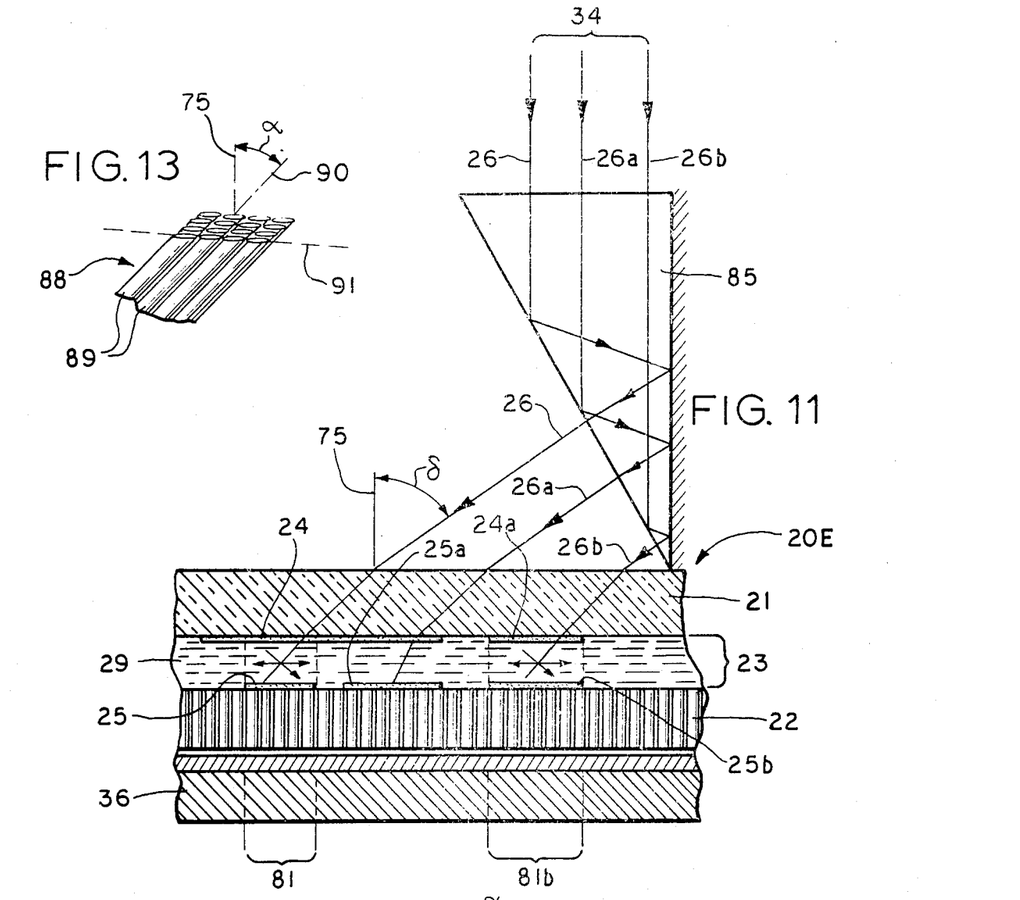
FIG. 11 is a view similar to FIG. 9 but showing another modified liquid crystal cell.
FIG. 13 is a view similar to FIG. 5 in that it shows a grouping of optical fibers of the fiber-optic plate shown in FIG. 12.

A modification is shown in FIG. 11, where the reference numerals used to indicate the same parts are the same as those in the embodiment of FIG. 9. A difference consists in that not only the top electrode 24, 24b is segmented, but the bottom electrode is also divided into individual segments 25, 25a, 25b. This makes it possible to obtain a still finer representation of the characters to be printed. As in the embodiments of FIGS. 4 and 9, the fiber-optic plate 22 is here also used as the rear end wall of cell 20E. The above-mentioned slant angle δ of the light beam 34 striking the cell is produced here by a fixed prism 85 disposed in front of the cell. Accordingly, the light beam 34 may be directed parallel to the dashed line 75. The desired slant is obtained by the prism 85. Any other optical deflection means could be used instead of the prism 85, e.g., an obliquely placed mirror.

Figure 12:
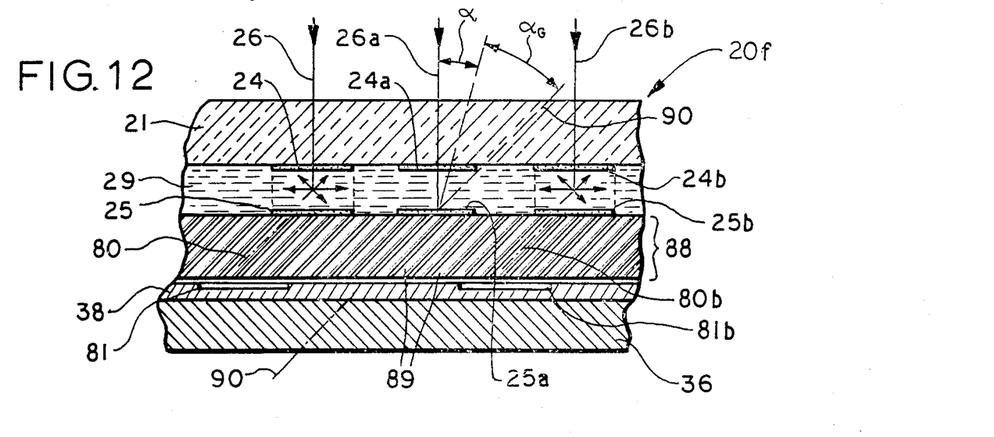
FIG. 12 is a cross-sectional view like FIGS. 9 and 11 and illustrating a still different embodiment of the invention.

Another embodiment is illustrated in FIG. 12, where the same reference numerals are likewise used to indicate the same components. To increase the character set, the electrodes are segmented here at both sides of the liquid chamber, i.e., into segments 24, 24a, 24b and 25, 25a, 25b. A major difference compared to the foregoing embodiments consists in that the incident light beam, here also represented by the three light rays 26, 26a, 26b, can strike the cell perpendicularly. In accordance with the electrical addressing of the individual electrode segments, illustrated here to be exactly as in the foregoing examples, the light ray 26a passes through the liquid crystal material 29 of the cell 20F, while the two other light rays 26, 26b are scattered in the liquid crystal material.

A specially constructed fiber-optic plate 88 is used here, having fibers 89 with fiber axes 90 inclined at an angle α which, as shown in FIG. 12, is larger than the limit angle $α_G$ for total reflection. Accordingly, the conditions of the above-mentioned formula (3) are satisfied for this plate construction also so that the results obtained here are similar to those in the preceding embodiments of FIGS. 9 and 11. As indicated in FIG. 12, the light ray 26a is attenuated or absorbed inside the fiber 89. However, the portions 80, 80b of the light rays 26, 26a are transmitted to the record carrier. It should be noted that the transmitting direction of this fiber-optic plate 88 is not vertical but oblique so that the corresponding image areas 81, 81b, irradiated in the photographic layer 38 of the record carrier 36, are offset in the direction of slant of the fibers 89. Because of the dot-wise reproduction by the fibers 89 arranged in parallel in the fiber-optic plate 88, no distortion occurs in the images 81, 81b of the electrode outlines 24, 25 and 24b, 25b respectively, projected by the light rays 26, 26b.

A portion of such a fiber-optic plate 88 is shown in perspective in FIG. 13. The axes 90 of the fibers are inclined at an angle α to the dashed line 75 and perpendicular to the plane 91 of the plate 88. The front surfaces of the fibers 89 define an angle α with the axes 90. It should be further appreciated the fiber-optic plate may optionally define an independent optical plate, rather than constitute one of the end walls of the cell.

Figure 14:
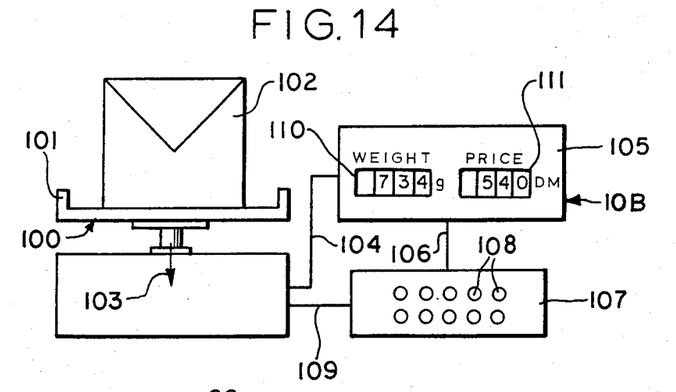
FIG. 14 is a schematic view of a further modification, and particularly a schematic view of a digital readout device utilized in connection with a weighing device according to the invention.

A modified system 10B is illustrated in FIG. 14, where the liquid crystal cell output is digitally displayed. The system 10B includes a weighing device 100 having a weighing platform 101 on which an article 102 when weighed produces a weight value 103 represented by an arrow. The weight value is transmitted by an electronic circuit, not shown in detail, through a control line 104 to a liquid crystal cell 20G in the digital display device 105 and illustrated generally in FIG. 15. This cell is connected by a further control line 106 to a computer 107 having a keyboard 108. The computer obtains input pulses from the weighing device 100 by an input line 109. It is possible to set up on the keyboard the price per unit weight of the article to be weighed by the weighing device. The corresponding price is determined by the computer 107 according to the weight value 103 of the merchandise 102 and is displayed on the display device 105 in a window 110. The selling price determined by the computer 107 according to the weight and price data selected by the keyboard 108 is displayed in a window 111.

Figure 15:
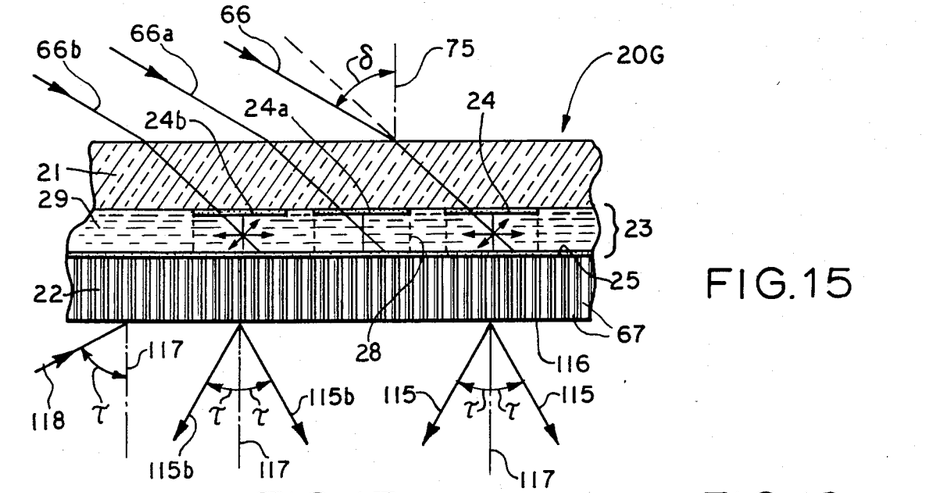
FIG. 15 is a greatly enlarged partially fragmentary and somewhat diagrammatic cross-sectional view taken through a liquid crystal cell utilized according to the apparatus of FIG. 14.

The cell 20G is illuminated, as shown in FIG. 15, obliquely from behind, at an angle δ by a light source not shown in detail. Since the cell 20G is of the same construction as the cell 20D shown in FIG. 9, like reference numerals indicating like parts are used. The difference here is that because of a digital display no record carrier is provided. The operation relative the light rays is essentially the same as in FIG. 9. Similarly, the same character display as in FIG. 3 is provided.

The light of the rays 26, 26b on the one hand and of the ray 26a on the other hand, treated in the substance 29 of the cell in a different manner as heretofore described, reaches the fiber-optic plate 22 which acts as an intensifier of the contrast between these rays, as was described in detail in connection with FIG. 10.

The corresponding components of the dispersed light from the cell 20G are indicated in FIG. 15 by 115 and 115b respectively. The light 115, 115b emerging at the display face 116 from the appropriate fibers 67 occupies a solid angle of two τ. The angle τ, enclosed between the boundaries of this solid angle and the perpendicular 117 relative to the surface of the display face 116 and indicated by a dash-dot line, when considering the medium on this side of the fiber-optic plate 22, i.e., air, is again a sort of limit angle for total reflection which could be calculated from the present indices of reflection with the aid of a formula similar to the formula (3).

If the display face 116 of the fiber-optic plate 22 in the display apparatus 10B according to the invention is observed at an angle τ to the aforementioned perpendicular 117, the character to be represented, made visible by addressing the corresponding electrode elements, appears in bright script at the individual places 110, 111 of the display device 105. Light entering obliquely from the surroundings, such as indicated in FIG. 15 by the arrow of light 118 which has an angle of incidence to the perpendicular 117 larger than this limit angle τ, cannot contribute to the irradiation inside the cell because this light 118 is subject to the conditions explained with respect to the light ray 70a of FIG. 10. Accordingly, this light is not transmitted through the fiber-optic plate 22 and cannot affect the image quality inside the cell. This permits the contrast of the projection to be improved even with customary transparency displays using optical projection of the measurement results onto a ground glass screen. Therefore, with the present invention, it is thus possible to dispense with the hoods placed in such cases in front of the reading windows.

Figure 19:
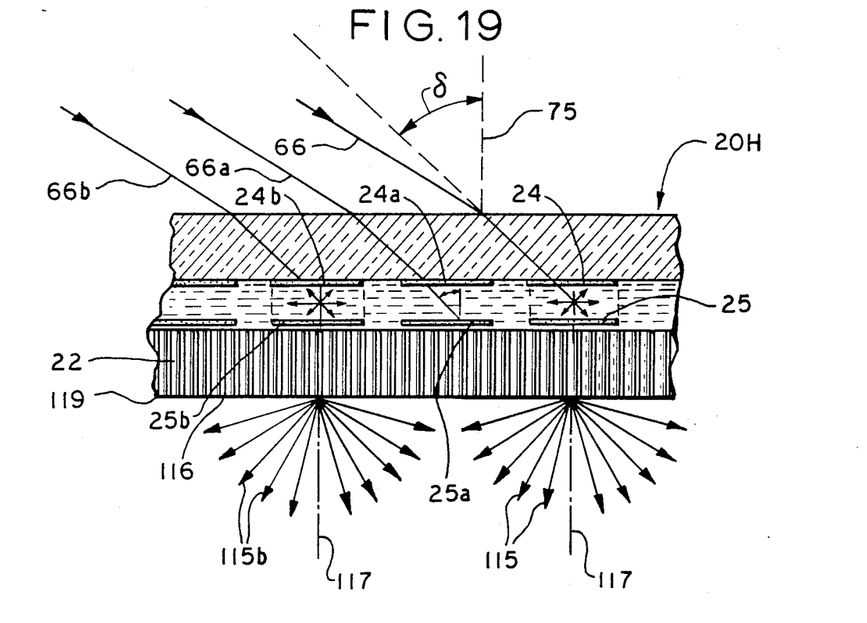
FIG. 19 is a cross-sectional view similar to FIGS. 15 and 17 and showing a still further embodiment of the invention.

The conditions present in the embodiment of the invention shown in FIG. 19 are similar to those of the embodiment of FIG. 15 so that the same reference numerals are used to indicate the same components. The cell is generally indicated by the numeral 20H. One difference consists in that here the counter-electrode is also segmented into several elements 25, 25a, 25b, so that a larger number of possibilities result in addressing the electrodes in combination with the other electrodes elements 24, 24a, 24b. Another difference resides in the surface facing the observer being frosted at 119 to increase the reading angle in the region of space to both sides of the perpendicular 117 to the display face 116 of the fiber-optic plate. This enables the eye to take in the light coming from the plate 22 practically within a solid angle of 180°. Therefore, even when the frosted face of the fiber-optic plate 22 is viewed obliquely, the character addressed in the cell 20H remains visible.

Figure 16:
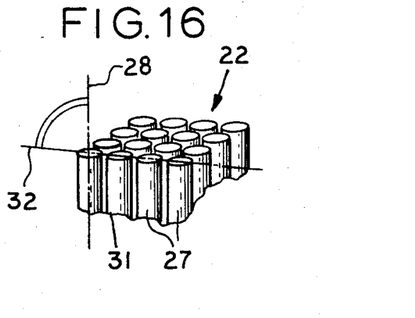
FIG. 16 is a detailed perspective view of the fiber-optic plate shown in FIG. 15.
Figure 17:
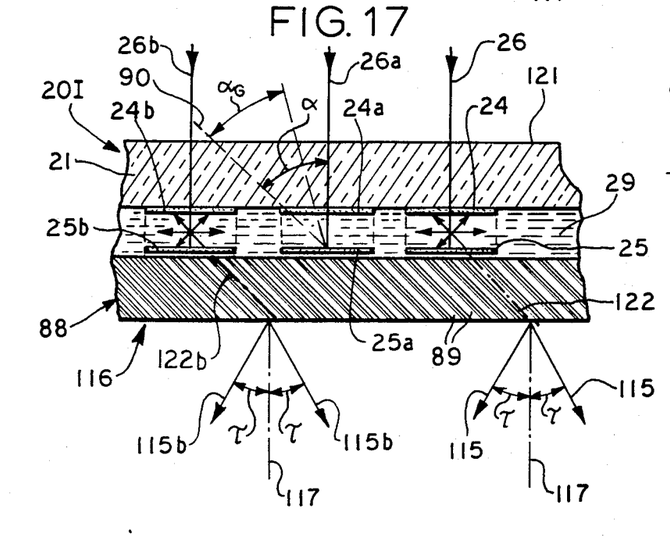
FIG. 17 is a cross-sectional view similar to FIG. 15 and showing a still further embodiment of the invention.

A further modified cell construction is shown in FIG. 17, where the same reference numerals as in the preceding figures are again used to indicate corresponding components and the cell is generally designated as 20I. This embodiment is similar to cell 20F of FIG. 16. Light striking the cell 20I from the rear enters perpendicular to the rear plane 121 of the cell 20, as can be seen from the three light rays 26, 26a, 26b, which contribute to the generation of the desired character by control of the electrode elements 24 to 25b, as heretofore explained.

The fiber-optic plate here is like that in FIG. 12, so like reference numerals are applied. As in the embodiment of FIG. 12, the light ray 26a is suppressed inside the fibers 89, while the components of the dispersed light of the two rays 26, 26b, where voltage is applied between the electrode elements 24, 25 and 24b respectively, are conducted without loss through the corresponding fibers 89 to the display face 116 of the fiber-optic plate. This is illustrated by the passage of the portions 122, 122b of light through the corresponding fibers 89, drawn for the sake of simplicity as straight lines along the axis 90 of the fiber. As already explained, this light is radiated from the display face 116 of the plate 88 within a range of solid angles enclosing an angle τ with the plotted perpendicular 117 to the plane of the display face 116. The resulting components serving to display the character which bound the solid angle are indicated here by 115, 115b.

Figure 18:
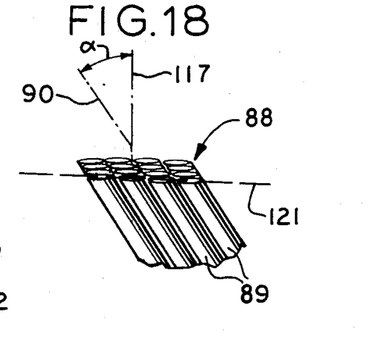
FIG. 18 is a detailed perspective view of the fiber-optic plate utilized in the embodiment of FIG. 17.

FIG. 18 shows a perspective illustration of a portion of the fiber-optic plate 88, where the plane 121 of the plate 88 is plotted dashed. The dash-dotted axis 90 encloses an angle α with the perpendicular 117, while the front faces of the fibers 89 are not at right angles to the axis 90 but enclose with the axis 90 a corresponding angle α.

Figure 20:
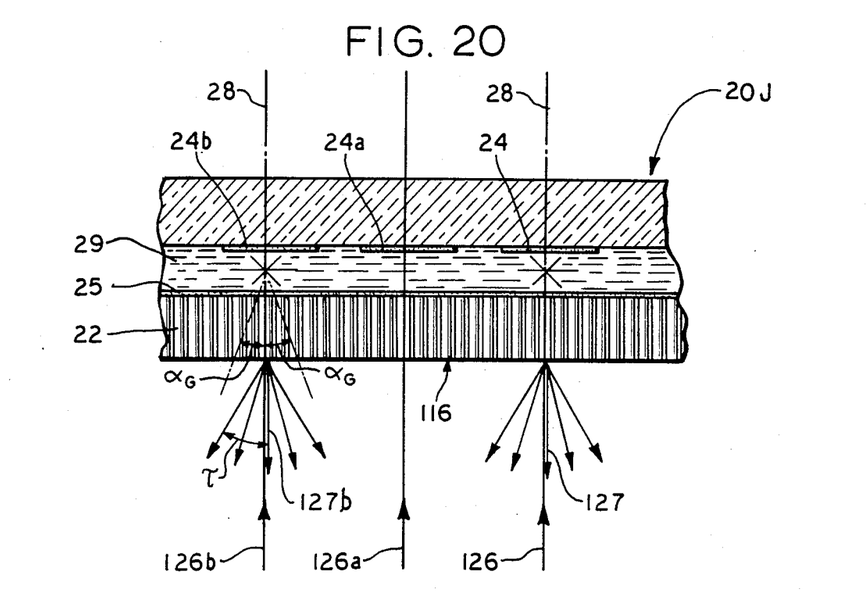
FIG. 20 is a cross-sectional view taken through a still further embodiment of the invention and being similar to FIGS. 15, 17 and 19.

The embodiment of FIG. 20 differs from the embodiment of FIG. 15 only in that the display face is illuminated from incident light at the display side, rather than transmitted light. Apart from the direction of light incidence, the construction of the cell 20J is the same as in FIG. 15 so that the like reference numerals are used to indicate like components. The fiber-optic plate here is illuminated from its display face 116 by the ambient light always present in the observation room. If desired, however, a lamp irradiating the cell 20J could be used.

Only the ambient light which is suitable to be transmitted through the fiber-optic plate in accordance with the formula (3) appropriately applied to the conditions prevailing in front of this optic plate is utilized. For the sake of simplicity, only three light rays 126, 126a, 126b of this light are plotted which strike the display face 116 of the plate 22 at a proper angle. As heretofore explained, the liquid crystal material is activated by addressing the electrodes 24, 24b so that the rays 126 and 126b are dispersed again. By application of the conditions explained in connection with the formula (3) and FIG. 10, the components of dispersed light lying inside the shown limit angle $\alpha_G$ relative the perpendicular direction of the fiber axes return to the fiber-optic plate 22 without being suppressed therein. In the embodiment illustrated in FIG. 20, only that component of dispersed light is shown again which enters the plate 22 at right angles, i.e., again parallel to the axis of the fiber; but this explanation applies practically to all afore-named components of dispersed light which fall back into the plate 22 inside the shown limit angle $\alpha_G$ to the axis of the fiber. The corresponding component 127, 127b of dispersed light is shown. As already illustrated in connection with FIG. 15, other rays entering the fibers inside the afore-named limit angle $\alpha_G$ lie inside the region of the solid angle τ, which is also that limit angle inside which the above-mentioned light entering from the surroundings can penetrate into the activated region of the liquid 29 in the cell without being suppressed in the region of the plate 22.

As in the foregoing embodiments, it is assumed that no voltage is applied to the region of space between the electrode 24a, wherein the light entering here which, as already mentioned, is represented by the light ray 126a, passes unimpeded through the cell and produces no component reflected back to the display face 116 of the plate 22. From this it is seen that only the returned dispersed light 127 and 127b respectively of the rays 126 and 126b forms bright dots on the display face 116, whereas at the location of the ray 126a a dark dot is formed on the display face 116. The bright dots, in accordance with the rays 127 and 127b, now produce dot by dot the character to be presented in bright script on a black background. A high contrast in the character display is thereby achieved with the present embodiment also, resulting in a good readability of the apparatus.

It will be understood that modifications and variations may be effected without departing from the scope of the novel concepts of the present invention, but it is understood that this application is to be limited only by the scope of the appended claims.

The invention is hereby claimed as follows:

1. An apparatus for producing data for display and/or recording purposes, said apparatus comprising: a liquid crystal cell having a pair of light transparent parallel spaced walls, said cell having an input side on one side of the cell at one of said walls and an output or display side on the opposite side thereof at the other of said walls, light transparent electrodes on the facing sides of the walls profiled to produce alpha-numerical data and/or machine-readable code marks, a source of light producing parallel light rays on the input side of the cell, means for addressing the electrodes in accordance with given information, a liquid crystal material between the walls, and a fiber-optic plate on the output side of the cell having a plurality of parallel arranged optical fibers embedded in a light-absorbing material, wherein the angle of inclination between the light rays produced by said source and the axes of the optical fibers exceeds the limit angle for which total reflection of light rays occurs in the fibers passing undisturbed through the liquid crystal material whereby such light rays do not pass through the fibers.

2. The apparatus defined in claim 1, which further includes a frosted outer surface on the fiber-optic plate for displaying the output of the cell.

3. The apparatus defined in claim 1, which further includes a photosensitive record carrier for receiving the output of the cell.

4. The apparatus defined in claim 1, which includes a plurality of transparent walls between which a plurality of bodies of liquid crystal material is confined.

5. The apparatus defined in claim 1, wherein said optical fibers are perpendicular to said plate and said light rays are inclined relative the plate.

6. The apparatus defined in claim 1, wherein said light rays are perpendicular to the plate and said optical fibers are inclined relative to the plate.

7. The apparatus defined in claim 1, wherein an optical prism is positioned between the light rays and said cell to incline the light rays relative the plate.

8. The apparatus defined in claim 1, wherein said plate forms one wall of the cell.

9. In an apparatus for weighing articles and applying alpha-numerical data and/or machinereadable code marks to the articles, which apparatus includes a liquid crystal cell for producing data and/or marks to be applied to a record carrier applicable to the articles, a weighing device for weighing the articles and feeding a first input to the cell, and a computer receiving the first input of the device and the input of a unit having adjustable and fixed text and feeding a second input to the cell, the improvement in the cell which comprises a pair of spaced transparent walls, said cell having an input side on one side of the cell at one of said walls and an output or display side on the opposite side thereof at the other of said walls, transparent electrodes on the facing sides of said walls, a liquid crystal material between said walls, means for electrically addressing said electrodes in accordance with said inputs, said electrodes profiled to produce said data and/or marks, a source of light producing parallel light rays directed to the input side of the cell, a fiber-optic plate at the output side of the cell having a plurality of parallel arranged optical fibers embedded in a light-absorbing material, and said source and optical fiber axes being such that the angle of inclination therebetween exceeds the limit angle for which total reflection within the fibers occurs of light rays passing undisturbed through the liquid crystal material whereby such light rays do not pass through the fibers.

10. The liquid crystal cell of claim 9, wherein the length of the fibers is at least several times the diameter thereof.

11. The liquid crystal cell of claim 9, wherein the length of each fiber is at least a thousand times the diameter thereof.

12. The liquid crystal cell of claim 9, wherein the angle of inclination is produced by arranging the fibers perpendicular to the plane of the plate and arranging the light rays at an angle relative the plane of the plate.

13. The liquid crystal cell of claim 9, wherein the angle of inclination is produced by arranging the fibers at an incline to the plane of the plate and arranging the light rays perpendicular to the plane of the plate.

14. The liquid crystal cell of claim 9, wherein the fiber-optic plate defines one wall of the cell.

15. The liquid crystal cell of claim 9, wherein the cell is divided by one or more transparent partition walls each of which is provided with transparent electrodes and between each adjacent pair is provided liquid crystal material.

16. In an apparatus for weighing articles and digitally displaying price and weight values, which apparatus includes a liquid crystal cell having a display face for displaying digital price and weight values, a weighing device for weighing the articles and feeding a first input to the cell to display the weight value, a computer receiving the first input of the device and the input of a unit having programmable text which in turn feeds a second input to the cell, the improvement in the cell which comprises a pair of spaced transparent walls, said cell having an input side on one side of the cell at one of said walls and an output or display side on the opposite side thereof at the other of said walls, transparent electrodes on the facing sides of said walls, a liquid crystal material between said walls, means for electrically addressing said electrodes in accordance with said inputs, said electrodes profiled to produce said weight and price values, a source of light producing parallel light rays directed to the input side of the cell, a fiber-optic plate at the output side of the cell having a plurality of parallel arranged optical fibers embedded in a light-absorbing material, and said source and optical fiber axes being such that the angle of inclination therebetween exceeds the limit angle for which total reflection within the fibers occurs of light rays passing undisturbed through the liquid crystal whereby such light rays do not pass through the fibers.

17. The liquid crystal cell defined in claim 16, wherein the display side of the cell is frosted.

18. In a liquid crystal cell having transparent parallel spaced front and back walls, a source of light producing parallel light rays at the back wall, transparent electrodes on the facing sides of said walls, and a liquid crystal material between said walls which when activated cause the scattering of light rays, the improvement in the front wall where an image may be produced being in the form of a fiber-optic plate comprising a plurality of parallel arranged optical fibers at an inclination to the light rays in excess of that which would cause total reflection of the light rays within the fibers, said plate having a plurality of parallel arranged optical fibers embedded in a lightabsorbing material for preventing the transmission of undisturbed light rays and allowing transmission of light rays disturbed by activation of electrodes.

* * * * *